(12) United States Patent
Kuo et al.

(10) Patent No.: US 8,939,289 B2
(45) Date of Patent: Jan. 27, 2015

(54) PACKING BOX FOR LIQUID CRYSTAL DISPLAY PANEL AND WATERPROOF STRUCTURE THEREOF

(71) Applicant: Shenzhen China Star Optoelectronics Technology Co., Ltd., Shenzhen, Guangdong (CN)

(72) Inventors: Yi-Cheng Kuo, Shenzhen (CN); Shihhsiang Chen, Shenzhen (CN); Jiaxin Li, Shenzhen (CN); Jiahe Cheng, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/809,906

(22) PCT Filed: Dec. 19, 2012

(86) PCT No.: PCT/CN2012/086964
§ 371 (c)(1),
(2) Date: Jan. 14, 2013

(87) PCT Pub. No.: WO2014/089862
PCT Pub. Date: Jun. 19, 2014

(65) Prior Publication Data
US 2014/0166522 A1    Jun. 19, 2014

(30) Foreign Application Priority Data
Dec. 14, 2012 (CN) .......................... 2012 1 0542446

(51) Int. Cl.
*B65D 81/05* (2006.01)
*B65D 85/30* (2006.01)
*G02F 1/1333* (2006.01)

(52) U.S. Cl.
CPC ............... *B65D 85/30* (2013.01); *B65D 81/05* (2013.01); *G02F 1/133308* (2013.01); *B65D 81/053* (2013.01); *B65D 81/054* (2013.01); *Y10S 206/811* (2013.01)
USPC ........... 206/454; 206/592; 206/594; 206/811; 361/679.01; 361/679.21; 349/58; 349/60

(58) Field of Classification Search
CPC .................... G02F 1/133308; G02F 2201/503; B65D 81/054; B65D 81/053; B65D 81/05
USPC ................. 206/454, 592, 586, 594, 811, 320; 362/97.2; 361/679.21; 349/58, 60; 378/182, 181, 187, 188
See application file for complete search history.

(56) References Cited

U.S. PATENT DOCUMENTS 835,836 A * 11/1906 Shulz ............................ 277/419
1,560,993 A * 11/1925 Hohmann ..................... 378/169
(Continued)

*Primary Examiner* — Mickey Yu
*Assistant Examiner* — Gideon Weinerth
(74) *Attorney, Agent, or Firm* — Andrew C. Cheng

(57) ABSTRACT

A waterproof structure of a packing box for a LCD panel is disclosed. The waterproof structure includes the first engaging portion and the second engaging portion. The first engaging portion is disposed on a bottom plate of the packing box. At least one opening passing through the bottom plate is disposed in the bottom plate. The first engaging portion is located between the opening and a side wall of the packing box. The second engaging portion is disposed on a bottom surface of a cushion of the packing box. The second engaging portion is corresponding to the first engaging portion to allow the second engaging portion engage with the first engaging portion when the cushion is disposed on the bottom plate. A packing box for a LCD panel is further disclosed.

1 Claim, 4 Drawing Sheets

(56) References Cited

U.S. PATENT DOCUMENTS

| | | | | |
|---|---|---|---|---|
| 2,075,987 A * | 4/1937 | Houck | 229/125.16 |
| 3,346,099 A * | 10/1967 | Thomas et al. | 206/539 |
| 3,383,507 A * | 5/1968 | Brackett et al. | 378/183 |
| 3,504,180 A * | 3/1970 | Tone | 378/184 |
| 3,511,990 A * | 5/1970 | Hauss | 378/187 |
| 3,655,034 A * | 4/1972 | Stollman et al. | 206/454 |
| 3,788,464 A * | 1/1974 | Skinner | 206/0.82 |
| 4,047,612 A * | 9/1977 | Lohmann | 206/454 |
| 4,060,173 A * | 11/1977 | Dahl | 220/4.23 |
| 4,081,686 A * | 3/1978 | Nieuweboer | 378/187 |
| 4,110,624 A * | 8/1978 | Conteas | 378/187 |
| 4,287,990 A * | 9/1981 | Kurick | 206/448 |
| 4,467,919 A * | 8/1984 | Bengtsson et al. | 206/455 |
| 4,589,125 A * | 5/1986 | Schmidt | 378/187 |
| 4,620,061 A * | 10/1986 | Appleton | 174/51 |
| 4,830,182 A * | 5/1989 | Nakazato et al. | 206/454 |
| 4,892,193 A * | 1/1990 | Thomas | 206/453 |
| 4,949,371 A * | 8/1990 | Young et al. | 378/184 |
| 4,984,688 A * | 1/1991 | Mikulin | 206/455 |
| 5,002,184 A * | 3/1991 | Lloyd | 206/305 |
| 5,008,920 A * | 4/1991 | Gralak | 378/185 |
| 5,025,465 A * | 6/1991 | Bauer et al. | 378/169 |
| 5,097,953 A * | 3/1992 | Gingras | 206/454 |
| 5,265,148 A * | 11/1993 | Bauer et al. | 378/182 |
| 5,280,894 A * | 1/1994 | Witcraft et al. | 269/287 |
| 5,297,678 A * | 3/1994 | Cullen | 206/455 |
| 5,310,075 A * | 5/1994 | Wyler | 220/4.02 |
| 5,314,068 A * | 5/1994 | Nakazato et al. | 206/454 |
| 5,565,656 A * | 10/1996 | Mottahed | 174/372 |
| 5,574,254 A * | 11/1996 | Mori et al. | 174/561 |
| 5,594,774 A * | 1/1997 | Schmidt | 378/177 |
| D380,765 S * | 7/1997 | Kernan | D16/236 |
| 5,652,781 A * | 7/1997 | Armbruster et al. | 378/182 |
| 5,725,100 A * | 3/1998 | Yamada | 206/710 |
| 5,782,370 A * | 7/1998 | Kamiya | 220/4.02 |
| 5,847,813 A * | 12/1998 | Hirayanagi | 355/75 |
| 5,912,944 A * | 6/1999 | Budinski et al. | 378/182 |
| 6,286,684 B1 * | 9/2001 | Brooks et al. | 206/710 |
| 6,296,386 B1 * | 10/2001 | Heidsieck et al. | 378/189 |
| 6,553,644 B2 * | 4/2003 | Karmaniolas et al. | 29/559 |
| 6,742,655 B2 * | 6/2004 | Kasakura | 206/592 |
| 6,927,335 B2 * | 8/2005 | Lim et al. | 174/50 |
| 6,929,125 B1 * | 8/2005 | Seamans | 206/316.1 |
| 7,059,475 B2 * | 6/2006 | Zabka et al. | 206/710 |
| 7,063,212 B2 * | 6/2006 | Ordonez | 206/703 |
| 7,077,281 B2 * | 7/2006 | Sato et al. | 220/3.8 |
| 7,219,798 B2 * | 5/2007 | Chen | 206/454 |
| 7,295,430 B2 * | 11/2007 | Ohtaki et al. | 361/679.55 |
| 7,303,071 B2 * | 12/2007 | Saito | 206/320 |
| 7,495,226 B2 * | 2/2009 | Jadrich et al. | 250/370.09 |
| 7,556,426 B2 * | 7/2009 | Nakajo et al. | 378/188 |
| 7,571,808 B2 * | 8/2009 | Kong et al. | 206/454 |
| 7,626,808 B2 * | 12/2009 | Tai et al. | 361/679.21 |
| 7,731,029 B2 * | 6/2010 | Su | 206/454 |
| 7,819,279 B2 * | 10/2010 | Galland et al. | 220/784 |
| 7,837,031 B2 * | 11/2010 | Counts | 206/0.84 |
| 8,322,532 B2 * | 12/2012 | Schafer et al. | 206/703 |
| 8,550,239 B2 * | 10/2013 | Nakonechny | 206/8 |
| 8,695,797 B2 * | 4/2014 | Maier | 206/320 |
| 8,701,886 B2 * | 4/2014 | Chen et al. | 206/454 |
| 8,701,912 B2 * | 4/2014 | Carnevali et al. | 220/4.22 |
| 8,711,299 B2 * | 4/2014 | Chen et al. | 349/58 |
| 2001/0035361 A1 * | 11/2001 | Mishiro et al. | 206/316.1 |
| 2003/0213716 A1 * | 11/2003 | Cleaver | 206/454 |
| 2003/0227605 A1 * | 12/2003 | del Puerto et al. | 355/51 |
| 2004/0026285 A1 * | 2/2004 | Perry et al. | 206/419 |
| 2004/0084465 A1 * | 5/2004 | Luburic | 220/792 |
| 2005/0051447 A1 * | 3/2005 | Nakajo et al. | 206/455 |
| 2005/0160651 A1 * | 7/2005 | Davis | 40/700 |
| 2007/0095711 A1 * | 5/2007 | Thompson et al. | 206/522 |
| 2007/0164020 A1 * | 7/2007 | Arnett et al. | 220/4.21 |
| 2008/0094786 A1 * | 4/2008 | Liou et al. | 361/679 |
| 2009/0297303 A1 * | 12/2009 | Hyobu et al. | 414/269 |
| 2010/0177261 A1 * | 7/2010 | Jin et al. | 349/58 |
| 2010/0236968 A1 * | 9/2010 | De Jesus | 206/523 |
| 2012/0024722 A1 * | 2/2012 | Chen | 206/204 |
| 2012/0031807 A1 * | 2/2012 | Shimomichi | 206/586 |
| 2013/0020220 A1 * | 1/2013 | Kolbow et al. | 206/454 |
| 2013/0206627 A1 * | 8/2013 | Kasuga | 206/454 |
| 2013/0248401 A1 * | 9/2013 | Nakase | 206/454 |
| 2013/0270134 A1 * | 10/2013 | Chen et al. | 206/320 |
| 2013/0270139 A1 * | 10/2013 | Chen et al. | 206/453 |
| 2013/0286322 A1 * | 10/2013 | Kuo et al. | 349/58 |
| 2013/0299375 A1 * | 11/2013 | Chen et al. | 206/454 |
| 2013/0306514 A1 * | 11/2013 | Hu et al. | 206/586 |

\* cited by examiner

PACKING BOX FOR LIQUID CRYSTAL DISPLAY PANEL AND WATERPROOF STRUCTURE THEREOF

CROSS-REFERENCE TO RELATED APPLICATION

This application claims priority from and the benefit under 35 U.S.C. §119(a) of Chinese Patent Application No. 201210542446.8, filed on Dec. 14, 2012, which is hereby incorporated by reference for all purposes as if fully set forth herein.

BACKGROUND OF THE INVENTION

1. Field of the Invention

The present invention relates to a manufacturing technology for liquid crystal display (LCD) apparatuses, more particularly, to a packing box for a liquid crystal display panel (LCD panel) and a waterproof structure thereof.

2. Description of the Related Art

Generally speaking, the processing for a thin film transistor liquid crystal display (TFT-LCD) panel comprises the front-end array process, the middle-end cell process, and the back-end liquid crystal module (LCM) process. The cell process is to combine the substrate which is the glass substrate having the TFT array fabricated on it during the front-end process with the color filters, and to inject liquid crystal molecules between two glass substrates, and to cut the panel into a desired size. After the cell process, the open cell LCD panel is assembled with other components, such as the backlight module, the printed circuit board (PC board), and the bezel. After that, it is delivered to the LCD terminal manufacturer so a complete machine assembly is performed to produce the final LCD product.

During the above-mentioned processing, the LCD panel needs to be transferred between different workshops and different manufacturers. In order to prevent the LCD panel from being damaged during transportation, a packing box for carrying the LCD panel is designed to make the transfer more reliable. The packing box is usually an integrated structure and is also called a blow-molded box because it is made by blow molding. However, the heavy weight of the integrated packing box makes it hard to carry. There is room for improvement of the packing box.

SUMMARY OF THE INVENTION

The present invention provides a packing box for a liquid crystal display panel and a waterproof structure thereof to reduce the weight and provide waterproof effect.

The present invention provides a waterproof structure of a packing box for a liquid crystal display panel. The waterproof structure comprises at least one first engaging portion and at least one second engaging portion. The first engaging portion is disposed on a bottom plate of the packing box for the liquid crystal display panel. At least one opening passing through the bottom plate is disposed in the bottom plate. The first engaging portion is located between the opening and a side wall of the packing box for the liquid crystal display panel. The second engaging portion is disposed on a bottom surface of a cushion of the packing box for the liquid crystal display panel. The second engaging portion is corresponding to the first engaging portion to allow the second engaging portion engage with the first engaging portion when the cushion is disposed on the bottom plate.

In one aspect of the present invention, the first engaging portion is a waterproof groove disposed on the bottom plate concavely and encompassing the opening.

In another aspect of the present invention, the second engaging portion is a protrusion disposed on the bottom surface of the cushion convexly, and the protrusion is engaged with the waterproof groove.

In another aspect of the present invention, the first engaging portion is a protrusion disposed on the bottom plate convexly and encompassing the opening.

In another aspect of the present invention, the second engaging portion is a waterproof groove disposed on the bottom surface of the cushion concavely, and the waterproof groove is engaged with the protrusion.

In still another aspect of the present invention, the number of the openings is four, and the openings are disposed in the bottom plate symmetrically and arranged in a 2×2 matrix.

In yet another aspect of the present invention, the number of the waterproof grooves is at least four.

The present invention also provides a packing box for a liquid crystal display panel. The packing box comprises a rectangular bottom plate, a side wall, and a cushion. The side wall is disposed along an edge of the bottom plate. The bottom plate and the side wall form an accommodation space for placing the liquid crystal display panel. The cushion is disposed on the bottom plate and tightly adhered to the bottom plate and the side wall. The packing box further comprises at least one first engaging portion disposed on a bottom plate and at least one second engaging portion disposed on a bottom surface of the cushion. At least one opening passing through the bottom plate is disposed in the bottom plate. The first engaging portion is located between the opening and the side wall. The second engaging portion is corresponding to the first engaging portion to allow the second engaging portion engage with the first engaging portion when the cushion is disposed on the bottom plate.

In one aspect of the present invention, the first engaging portion is a waterproof groove disposed on the bottom plate concavely and encompassing the opening.

In another aspect of the present invention, the second engaging portion is a protrusion disposed on the bottom surface of the cushion convexly, and the protrusion is engaged with the waterproof groove.

In another aspect of the present invention, the first engaging portion is a protrusion disposed on the bottom plate convexly and encompassing the opening.

In another aspect of the present invention, the second engaging portion is a waterproof groove disposed on the bottom surface of the cushion concavely, and the waterproof groove is engaged with the protrusion.

In still another aspect of the present invention, the number of the openings is four, and the openings are disposed in the bottom plate symmetrically and arranged in a 2×2 matrix.

In yet another aspect of the present invention, the number of the waterproof grooves is at least four.

The present invention further provides a packing box for a liquid crystal display panel. The packing box comprises a rectangular bottom plate, a side wall, and a cushion. The side wall is disposed along an edge of the bottom plate. The bottom plate and the side wall form an accommodation space for placing the liquid crystal display panel. The cushion is disposed on the bottom plate and tightly adhered to the bottom plate and the side wall. The packing box further comprises at least one waterproof groove and at least one protrusion. The waterproof groove is disposed on the bottom plate concavely. At least one opening passing through the bottom plate is disposed in the bottom plate. The waterproof groove is located between the opening and the side wall and encompassing the opening. The protrusion is disposed on a bottom surface of the cushion convexly. The protrusion is corresponding to the waterproof groove to allow the protrusion engage with the waterproof groove when the cushion is disposed on the bottom plate.

In contrast to the prior art, the overall weight of the packing box is reduced because of the hallowed out structure formed by disposing the opening passing through the bottom plate in the present invention packing box for a liquid crystal display panel and a waterproof structure thereof. At the same time, the engaging structure is disposed so the travelling route for moisture is changed from a straight line to a polyline even when the moisture is able to enter from the opening. Hence, the travelling route for moisture is blocked or lengthened to provide waterproofing effect.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The features and advantages of the preferred embodiments of the present invention will be more apparent from the following detailed description taken in conjunction with the accompanying drawings.

Figure 1:
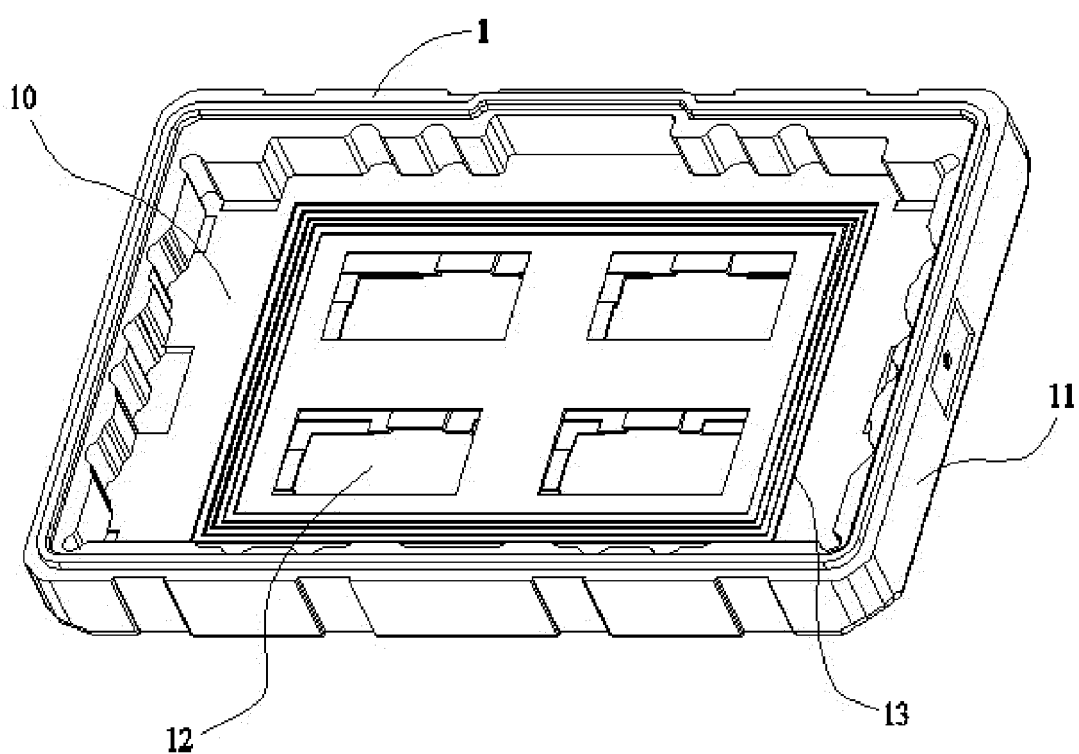
FIG. 1 is a schematic diagram showing a packing box for a LCD panel according to an embodiment of the present invention.
Figure 2:
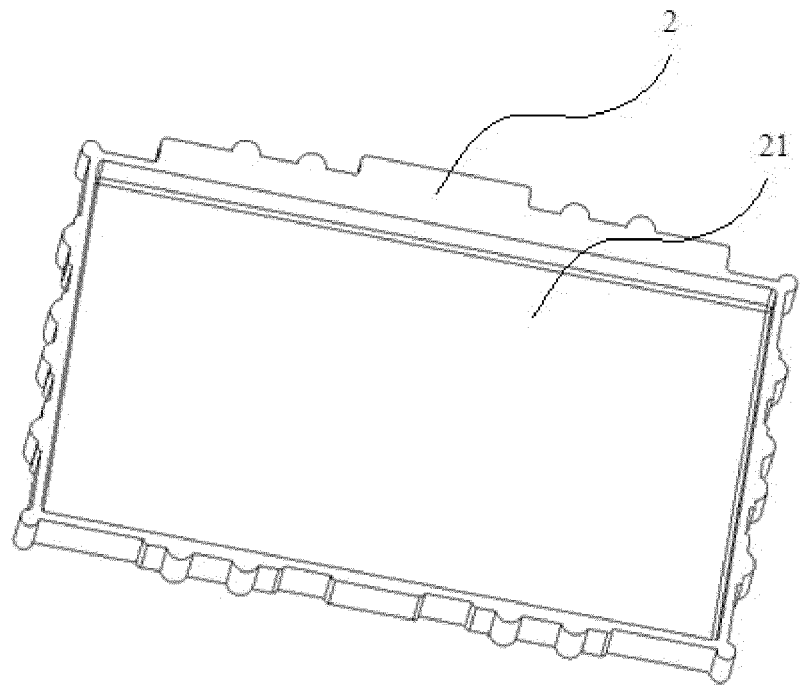
FIG. 2 is a schematic diagram showing a top surface of the cushion.
Figure 3:
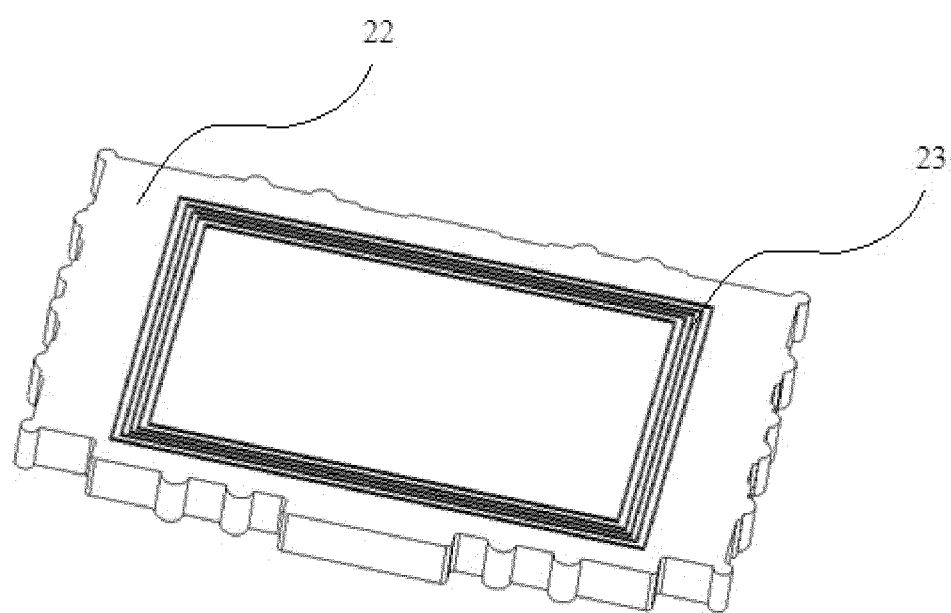
FIG. 3 is a schematic diagram showing a bottom surface of the cushion.

Please refer to FIG. 1, a packing box 1 for a LCD panel is provided according to an embodiment of the present invention. The present invention packing box 1 for the LCD panel comprises a rectangular bottom plate 10 and a side wall 11 disposed along an edge of the bottom plate 10. The bottom plate 10 and the side wall 11 form an accommodation space for placing the LCD panel. In order to prevent the LCD panel from colliding with the bottom plate 10 to cause damage during transportation, a cushion 2 is disposed on the bottom plate 10 before the LCD panel is disposed on the cushion 2. The cushion 2 thus serves as a shock absorber. A shape of an edge of the cushion 2 matches with a shape formed by the side wall 11 so that the cushion 2 will not slacken after being disposed on the bottom plate 10. FIG. 2 and FIG. 3 are schematic diagrams showing a top surface 21 and a bottom surface 22 of the cushion 2 respectively. The LCD panel is disposed on top of the top surface 21. The bottom surface 22 covers the bottom plate 10 and is tightly adhered to the bottom plate 10.

In order to overcome the drawback of the prior art, namely to reduce the weight of the packing box 1, at least one opening 12 passing through the bottom plate 10 is disposed in the bottom plate 10. The opening 12 thus forms a hallowed out structure in the bottom plate 10. There is no strict limitation to the position and number of the opening 12 in the bottom plate 10. However, when considering the convenience for production and stress uniformity of the bottom plate 10 after the opening 12 is disposed, the opening 12 is preferred to be disposed in the bottom plate 10 symmetrically. More preferably, four openings 12 are arranged in a 2×2 matrix. Owing to the hallowed out design of the bottom plate 10, its weight is reduced so that the overall weight of the packing box is reduced.

It is worth noticing that when the weight of the bottom plate 10 is reduced because the opening 12 passes through the bottom plate 10, the waterproof issue of the packing box needs to be considered. With the opening 12, the cushion 2 will directly contact with the external environment. At the same time, a certain gap exists between the cushion 2 and the bottom plate 10 which are in plane-plane contact. During transportation of the LCD panel, moisture in the air, or rain or thawing water under bad weather conditions is likely to pass through the opening 12 and enter into the packing box 1, then move along the gap between the cushion 2 and the bottom plate 10 to contaminate the LCD panel.

According to an embodiment of the present invention, a waterproof structure is provided to realize waterproofing effect. Since the LCD panel is disposed on top of the cushion 2, moisture entering from the opening 12 will reach to the LCD panel via edges of the cushion 2. Therefore, engaging structures may be disposed along this path so that moisture travels along a polyline rather than a straight line. As a result, the travelling route of moisture is blocked or lengthened. The engaging structure comprises two parts, which are a first engaging portion disposed on the bottom plate 10 and between the opening 12 and the side wall 11 and a second engaging portion disposed on the bottom surface 22 of the cushion 2 and corresponding to the first engaging portion. Under the circumstances, the second engaging portion on the bottom surface 22 of the cushion 2 engages with the first engaging portion on the bottom plate 10 to form a tight engaging structure when the cushion 2 is put on the bottom plate 10. Specifically, the engaging structure is realized by the cooperation of a groove and a protrusion: 1) a waterproof groove (the first engaging portion) disposed on the bottom plate 10 concavely, and a protrusion (the second engaging portion) disposed on the bottom surface 22 of the cushion 2 convexly; 2) a protrusion (the first engaging portion) disposed on the bottom plate 10 convexly, and a waterproof groove (the second engaging portion) disposed on the bottom surface 22 of the cushion 2 concavely. Since the two realizing methods have similar principles and similar structures, for the sake of describing briefly, the first realizing method is taken as an example for illustration. It should be understood that the principles and structures referred in the first realizing method may be also applied to the second realizing method.

Figure 4:
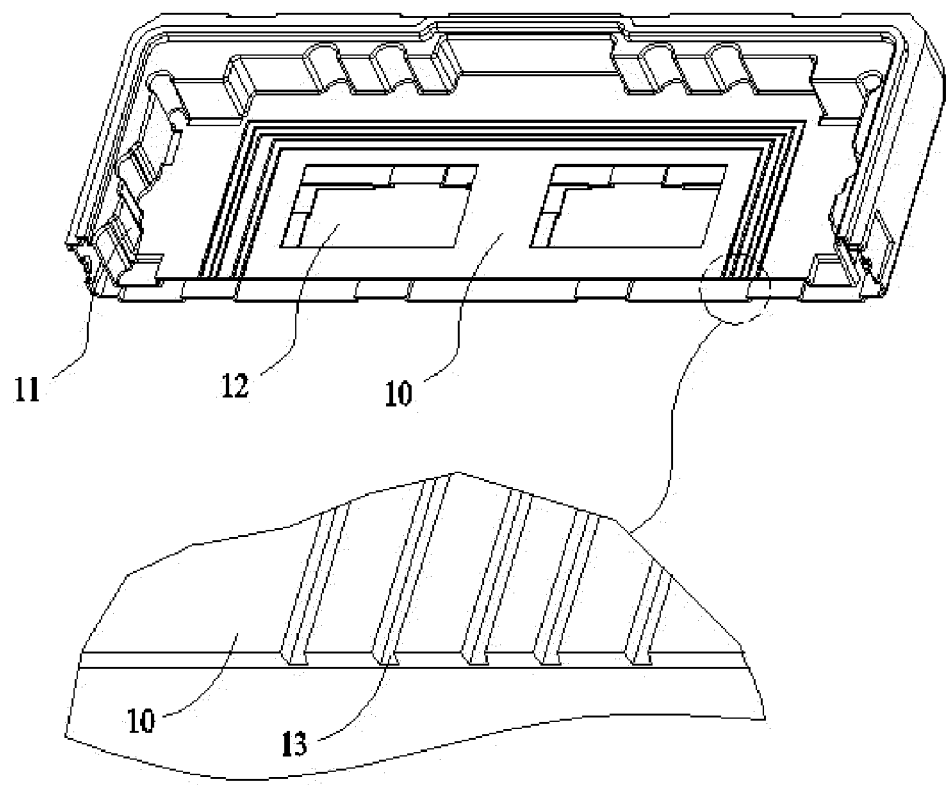
FIG. 4 is a schematic diagram showing a structure of waterproof grooves according to an embodiment of the present invention.

Please refer to FIG. 4, waterproof grooves 13 are disposed on the bottom plate 10 surrounding the openings 12 in the packing box 1 according to an embodiment of the present invention. Because the LCD panel is disposed on the cushion 2, moisture entering from the openings 12 must travel through the edges of the cushion 2 before reaching to the LCD panel. Hence, the waterproof grooves 13 must be disposed along the route so as to block or lengthen the travelling route of the moisture. In the present embodiment, the waterproof grooves 13 are disposed on the bottom plate 10 between the openings 12 and the side wall 11 and surrounding the openings 12. Since the edges of the cushion 2 are tightly adhered to the side wall 11, the waterproof grooves 13 are located between the openings 12 and the edges of the cushion 2. Preferably, there are at least four waterproof grooves 13. If the openings 12 are arranged in the above-mentioned 2×2 matrix, the waterproof grooves 13 are preferably arranged in an enclosed form to encompass the openings 12. Of course, the waterproof grooves 13 may be arranged in such a manner that each of the openings 12 is encompassed by one of the waterproof grooves 13.

Figure 5:
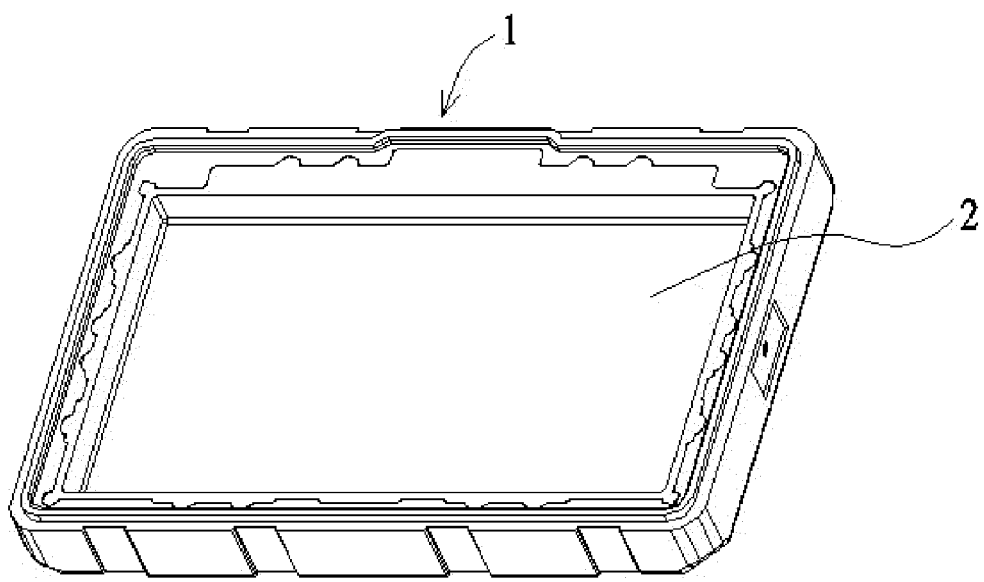
FIG. 5 is a perspective view of a structure of the packing box after assembly.

Again, as shown in FIG. 3, a plurality of protrusions 23 are disposed on the bottom surface 22 of the cushion 2 and are corresponding to the waterproof grooves 13 in the packing box 1 according to the present embodiment. The protrusions 23 on the bottom surface 22 of the cushion 2 cooperate with the waterproof grooves 13 on the bottom plate 10 when the cushion 2 is put on the bottom plate 10. That means, the protrusions 23 engage with the waterproof grooves 13 to form tight engaging structures. The perspective view of a structure of the packing box after assembly is shown in FIG. 5.

Figure 6:
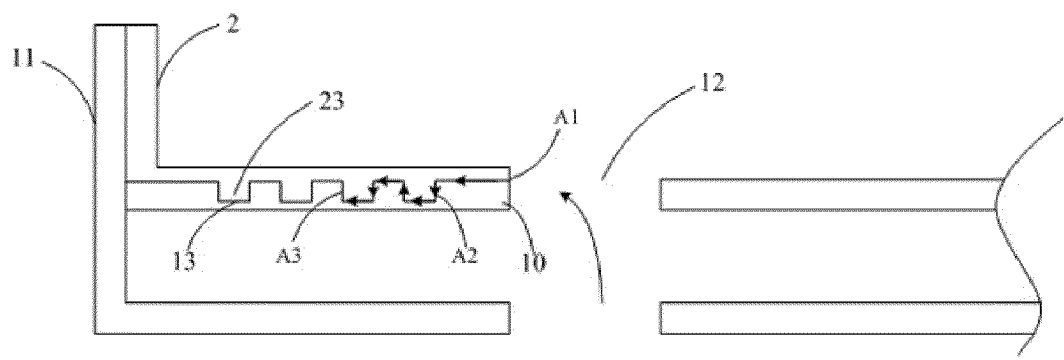
FIG. 6 is a schematic diagram showing the travelling route of the moisture in the packing box structure according to the embodiment of the present invention.

By disposing the waterproof grooves 13 on the bottom plate 10 and the protrusions 23 on the bottom surface 22 of the cushion 2 correspondingly, the travelling route of the moisture is effectively blocked or lengthened when it enters from the openings 12. FIG. 6 is a schematic diagram showing the travelling route of the moisture in the packing box structure according to the embodiment of the present invention. The arrow in FIG. 6 indicates the travelling direction and route of the moisture. It can be seen that the moisture moves along the gap between the cushion 2 and the bottom plate 10 after entering from the opening 12. It first penetrates into A1. But since the waterproof grooves 13 and the protrusions 23 are disposed, the moisture must turn down when arriving at A2, then turn left and turn up to penetrate through the gaps between the waterproof grooves 13 and the protrusions 23. When comparing with the straight route that is formed without disposing any waterproof groove 13 and protrusion 23, the travelling route for the moisture becomes a polyline and is lengthened in the structure having the waterproof grooves 13 and the protrusions 23 even when the moisture is able to enter into the structure. Under the circumstances, the moisture is only allowed to reach to A3 and cannot penetrate continuously owing to the energy loss on the route. It is therefore blocked at A3.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packing box for a liquid crystal display panel, comprising:
    a bottom plate having inner and outer surfaces, a side wall, a plurality of openings disposed in the bottom, plate, and, a plurality of first tongue and groove engagement members arranged on the inner surface;
    a cushion member comprising top and bottom surfaces, the bottom surface of the cushion member having a plurality of corresponding second groove and tongue engagement members corresponding to the plurality of first tongue and groove engagement members;
    wherein the cushion member is placed on top of the inner surface of the bottom plate so as to have the plurality of first tongue and groove engagement members to create a waterproof seal with the plurality of second groove and tongue engagement members; and
    wherein the plurality of openings disposed in the bottom plate comprises four openings arranged symmetrically in a 2×2 matrix and is encompassed within the plurality of first tongue and groove engagement members.

* * * * *